United States Patent [19]

Martinez

[11] 3,757,479
[45] Sept. 11, 1973

[54] MIRROR
[75] Inventor: Eugene Martinez, Irvington, N.Y.
[73] Assignee: Kamar Products, Inc., Irvington-on-Hudson, N.Y.
[22] Filed: Dec. 27, 1971
[21] Appl. No.: 212,066

[52] U.S. Cl.................. 52/222, 160/392, 350/288, 52/656
[51] Int. Cl............................................... A47g 1/00
[58] Field of Search...................... 52/222, 717, 718; 160/392, 393, 394

[56] References Cited
UNITED STATES PATENTS

| 3,205,001 | 9/1965 | Abolins | 52/222 X |
|---|---|---|---|
| 2,378,163 | 6/1945 | Thomas | 160/392 X |
| 3,545,154 | 12/1970 | Bobzin et al. | 52/716 X |
| 3,687,502 | 8/1972 | Loew | 52/716 X |

Primary Examiner—Frank L. Abbott
Assistant Examiner—Carl D. Friedman
Attorney—J. B. Felshin

[57] ABSTRACT

This mirror comprises a frame with an external continuous groove having opposed side undercuts. A flexible strip presses a flexible reflective sheet into the groove to hold said sheet in stretched condition on the frame to provide a smoth mirror surface. The flexible strip is normally of inverted V-shape, with wings that can be pressed down and toward each other to reduce the overall width of the strip to enable the strip to easily enter the groove, and press the reflective sheet into the groove. When the outer edges of the wings of the strip are in the groove, the apex of the strip is pressed down to invert its shape from inverted V-shape to V-shape to tightly press the mirror sheet into the undercuts. The top of the apex of the normal inverted V-shaped strip has a longitudinal slot to limit the inversion of the strip from inverted V-shape to V-shape as the slot closes.

10 Claims, 10 Drawing Figures

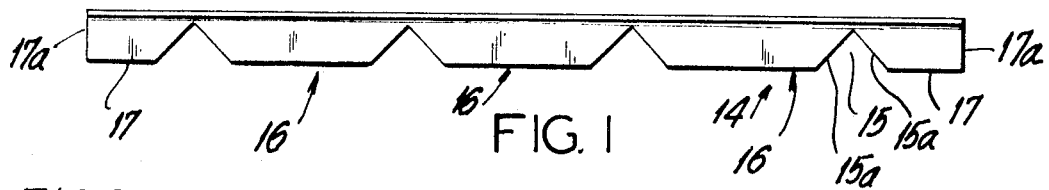
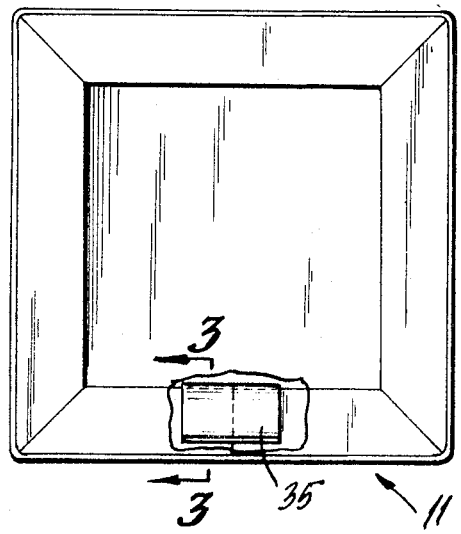
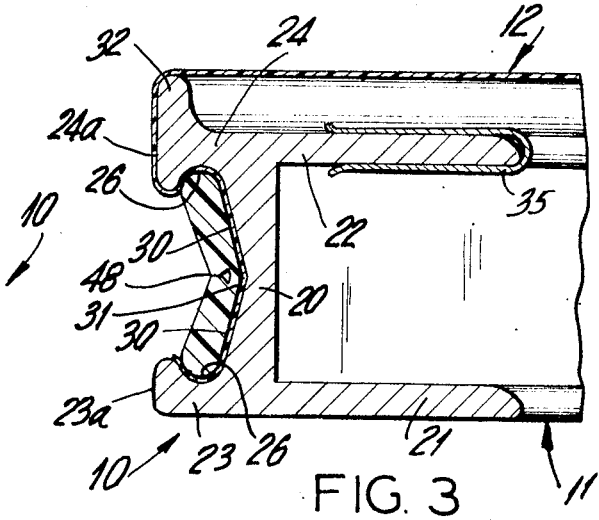
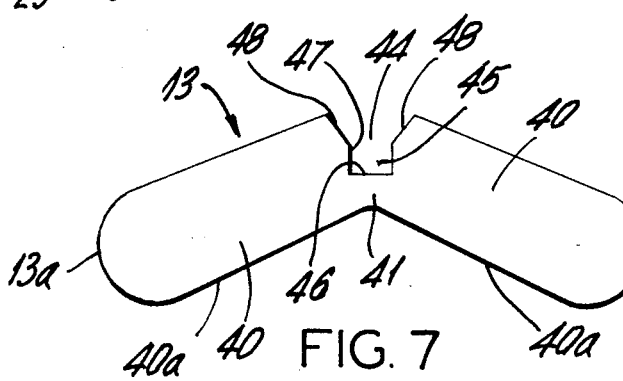
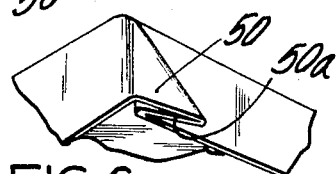

MIRROR

This invention relates to glass-less mirrors. An object of this invention is to generally improve the glass-less mirror disclosed in my copending Pat. application Ser. No. 104,241 filed Jan. 6, 1971 for glass-less mirror.

Another object of this invention is to provide a glass-less mirror of the character described comprising a frame with a continuous groove and a flexible strip pressing a flexible sheet with a mirrored surface, into the groove to hold the sheet in tight stretched condition to provide a mirror surface, in which the strip is of such cross-sectional shape that its side edges press portions of the sheet into opposed undercuts in the groove with a toggle action.

Still another object of this invention is to provide in a glass-less mirror of the character described, a frame having a groove with a V-shaped bottom and with opposed side undercuts, and a flexible binding strip of normal inverted V-shape, the wings of which can be pressed together to facilitate insertion of the strip into the groove and the longitudinal apex of which can then be pressed down to bring the strip to V-shape, with its side edges pressing the flexible mirror sheet into the undercuts of the groove.

Yet another object of this invention is to provide in a glass-less mirror of the character described, a binding strip of resilient flexible material which is normally of inverted V-shape, with wings that can be flexed down and together to reduce the width of the strip, to facilitate its insertion into a frame groove, said strip having a longitudinal slot in its upper apex, to permit said strip to be flexed into V-shape, said slot being of such shape as to limit inversion of the strip to V-shape as the slot closes, with the wings at less angularity to the horizontal than the angularity of the wings in normal inverted V-shape, and the width of the strip in V-shape is normally greater than the width of the groove, so that the strip is somewhat compressed to tightly bind the flexible mirror sheet to the frame in tight and smooth condition to provide a good flat mirror surface.

A further object of this invention is to provide in a mirror of the character described, a frame having a groove provided with side undercuts, the bottom of the groove being V-shaped and conforming to the angularity of the strip when it is pressed into the groove to V-shape, to hold the strip in its position with the slot closed, and at such angle that it will securely bind the mirror sheet to the frame.

A still further object of this invention is to provide a strong and durable glass-less mirror of the character described which shall be relatively inexpensive to manufacture, which may be made in a variety of shapes, which shall be easy to assemble, and yet practical, safe and efficient in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, FIG. 1 is a top view of a mitered piece of extruded framing for making a frame for a glass-less mirror embodying the invention;

FIG. 2 is a rear view of a glass-less mirror embodying the invention;

FIG. 3 is a cross-sectional view taken on line 3—3 of FIG. 2;

FIG. 4 is a perspective enlarged view of a part of the framing member of FIG. 1;

FIG. 5 is a partial perspective view of one corner of the glass-less mirror of FIG. 2;

FIG. 6 is a partial perspective view showing a corner fold of the flexible mirror sheet at one corner of the glass-less mirror, in another angle;

FIG. 7 is a cross-section of the strip in normal condition;

Figure 8:
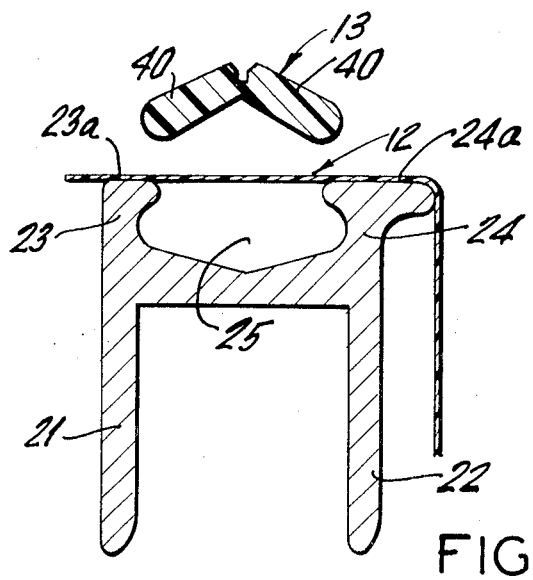
FIG. 8 is a view like FIG. 3 but showing the strip above the groove in the frame before squeezing the wings together.

Referring now in detail to the drawing, 10 designates a glass-less mirror embodying the invention. Said mirror 10 comprises generally of a frame 11 provided with a mirror sheet 12 fixed to the frame by a flexible strip 13.

The frame shown in the drawing is rectangular in shape, although the frame could be round or oval or elliptical in shape or have any other desired suitable shape.

The frame may be a casting, or, as shown in the drawing, it may be made of an extruded piece 14 of aluminum alloy or of any other suitable metal or other material.

The mitered notches designated by numeral 15, are spaced to provide, three similar lengths 16 and two end half lengths 17. The cross sectional shape of the extrusion of which the frame is made, is shown in FIG. 3. Said frame has an outer transverse wall 20 from which two flanges 21, 22 extend parallelly. Flange 21 will be at the rear of the mirror 10 while flange 22 will be at the front of the mirror. Extending outwardly from transverse wall 20 is a wall 23 aligned with flange 21, and a wall 24 aligned with flange 22. Between walls 23, 24 is formed a groove 25 having side undercuts 26 to provide overhang portions 27 extending from walls 23, 24 overlying the groove. At the bottom of groove 25 (or at top of transverse wall 20) is a wide V-shaped surface formed with inclined converging surface portions 30 meeting in a longitudinal apex 31. The undercuts 26 are semi-cylindrical in shape and merge with the inclined surfaces 30. Extending from wall 24 is an overhang ledge 32.

The sheet 12 is a glass-less mirror. This sheet may comprise a clear or transparent polyester film or vinyl, acrylic or acetate film coated with aluminum or the like mirroring metal. One side of the film is vacuum plated to coat with metal or it may be electroplated or coated in any other suitable way. The coated side of the mirror is the inside or mirror side. For a rectangular frame, a rectangular sheet is employed. The size of sheet 12 is equal to the size of the frame plus enough border to fit over the upper surfaces 23a, 24a of walls 23, 24 and overhang flange 32 and to line the inner surface of groove 25 including the undercuts 26. The strip 13 to be described in detail hereinafter, binds the film in the groove 25.

Said strip 13, before assembly with the frame, is shown in cross-section in FIG. 7. Said strip is made of flexible, resilient, compressible synthetic plastic or rubber. Said strip is a single continuous strip of proper length to go all around the frame. After the frame is cut to size and mitered, it is bent into rectangular shape. The miters or notches are right angles. Enough metal is left to allow bending into polygonal shape. The mitering may extend somewhat into the groove 25. The mitering cuts away portions of flanges 21, 22 and form edges 15a at about 45° to the overhang 32. The outer ends 17a of parts 17 of the frame abut. The frame is held in rectangular shape with the ends 17a abutting, by a spring clip 35 which is of U-shape and thin enough to frictionally and resiliently engage adjacent portions of flanges 22 near the abutment.

The strip 13 is normally of inverted V-shape and comprises wings 40 connected by an apex portion 41. The outer ends 13a of wings 40 are rounded or semicylindrical and of substantially the same radius as the undercuts 26. The wings may increase in thickness slightly, in an outward direction.

At the top or outer side of the strip there is formed a longitudinal slot 44 comprising a bottom rectangular part 45 forming a bottom surface 46 from which parallel side surfaces 47 extend upwardly. Bottom surface 46 is disposed above the underside of the apex 41. Extending upwardly and outwardly from the upper ends of surfaces 47 are surfaces 48 inclined at 45°.

The angle of undersurfaces 40a of wings 40 to the horizontal, as seen in FIG. 7 is greater than the angles of surfaces 30 of groove 25 to the vertical, as seen in FIG. 3. The width of the normal strip 13 between the two vertical planes tangent to the surfaces 13a is greater than the distances between two horizontal planes tangent to the undercut surfaces 26 in FIG. 3.

Figure 9:
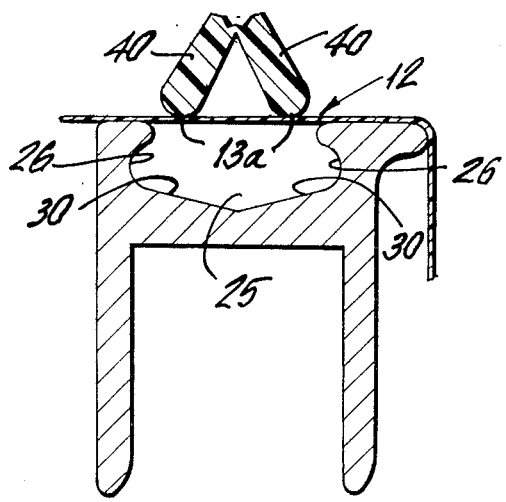
FIG. 9 is a view similar to FIG. 8 but showing the wings of the strip squeezed together to permit insertion of the strip into the groove.
Figure 10:
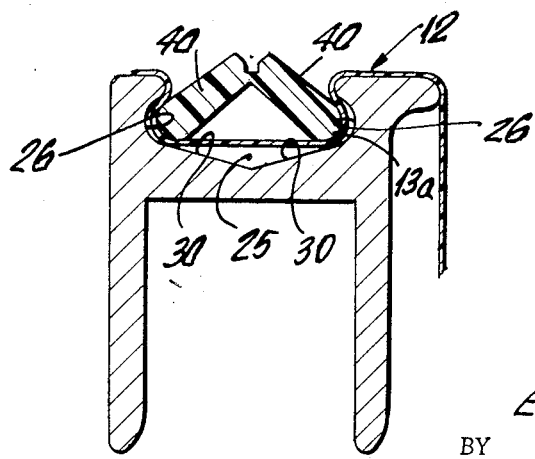
FIG. 10 is a view similar to FIG. 9 but showing the strip released within the groove prior to pushing the apex of the strip down to cause inversion of the strip from inverted V-shape of FIG. 7 to V-shape of FIG. 3.

After the film 12 is placed over the front of the frame and over the outer surfaces 23a, 24a of walls 23, 24 and flange 32, the strip can be made to bind the film in the groove 25 by first placing a portion of the strip above the grooves as shown in FIG. 8, then pressing the wings 40 together as shown in FIG. 9, then pushing the strip down into the groove as shown in FIG. 10. Then pressure is applied downwardly against the apex of the strip to turn the strip from inverted V-shape to V-shape as shown in FIG. 3. During such action, the surfaces 48 come together into contact. When such contact takes place, the wings 40 will press the film down into surfaces 30 and into contact with the internal undercut surfaces 26. The strip then has a toggle action and cannot become loose because to come out of the groove, the strip would have to substantially increase in width as the strip flattens. Also it should be noted that the strip when fully in the groove, as shown in FIG. 3, its normal width, if not compressed, would be greater than its normal width when the strip is not in the groove. This is so because the strip is flatter when in the groove than in normal unflexed, inverted V-shape. The flatter the strip is, the wider it is. Hence the strip is in compression because it is flatter in the groove than when it is in normal unconstricted condition. The shallower inclined surfaces 30 prevent the strip from becoming narrower and prevent increasing its angularity when in the groove.

The strip can be worked into the groove beginning at one end and going along toward the other end. Preferably the ends of the strip are at a side of the frame remote from the side which has the abutting ends 17a.

The corners of the film 12 can be folded as shown in FIG. 6 by folding the square corner sections into contacting triangular sections 50, 50a.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. In combination, a frame, a flexible sheet over said frame, said frame having a groove, said groove having undercuts at its sides and a V-shaped bottom, and a strip pressing said sheet into said groove to bind the sheet tight on the frame, said strip normally having inclined wings and an apex at the junction of the wings and having a longitudinal slot at the top of the apex and being of normal inverted V-shape when not in the groove and being pressed into V-shape so that said wings extend upwardly into said undercuts when in the groove, and wherein the thickness of said sheet is substantially less than the thickness of said wings.

2. The combination of claim 1, wherein a portion of the surface of said sheet which is in contact with said wings resides within the undercut of said groove.

3. The combination of claim 1, said strip having opposed spaced surfaces at the inside of its slot which come into contact with each other when the strip is moved from normal inverted V-shape to V-shape in the groove.

4. The combination of claim 1, the bottom of said groove having inclined surfaces making a V and against which said wings press said sheet when said strip is moved from inverted V-shape out of the groove, to V-shape in the groove, with the outer edges of said wings pressing said sheet against said undercuts.

5. The combination of claim 4, the width of said strip in normal condition being greater than the width of the mouth of the groove, so that said wings have to be pressed together to facilitate insertion of the ends of the wings into said groove.

6. The combination of claim 4, said inclined surfaces at the bottom of the groove being of less angularity than said wings in the normal unflexed condition of said strip.

7. The combination of claim 6, said slot having a lower rectangular portion, from which inclined surfaces extend outwardly and upwardly, said inclined surfaces contacting one another when said strip is pressed from inverted V-shape to V-shape in the groove.

8. The combination of claim 7, the width between the undercut portion of the groove being substantially equal to the width of the normal unflexed strip.

9. The combination of claim 1, said groove being continuous all around the frame.

10. The combination of claim 9, said strip being flexible and continuous.

* * * * *